US005579394A

United States Patent [19]

Waldron, Jr. et al.

[11] Patent Number: 5,579,394
[45] Date of Patent: Nov. 26, 1996

[54] CLEAR CHANNEL INTERFACE MODULE AND METHOD THEREFOR

[75] Inventors: William B. Waldron, Jr., Chandler; Terrel W. Sandberg; Paul R. Kennedy, both of Mesa, all of Ariz.

[73] Assignee: Motorola, Inc., Schaumburg, Ill.

[21] Appl. No.: 301,386

[22] Filed: Sep. 6, 1994

[51] Int. Cl.[6] .......... H04N 9/12
[52] U.S. Cl. .......... 380/49; 380/48
[58] Field of Search .......... 380/49, 9, 48

[56] References Cited

U.S. PATENT DOCUMENTS

| | | | |
|---|---|---|---|
| 5,177,734 | 1/1993 | Cummiskey et al. | 370/32.1 |
| 5,185,783 | 2/1993 | Takahashi et al. | 379/93 |
| 5,216,519 | 6/1993 | Daggett et al. | 358/434 |
| 5,230,020 | 7/1993 | Hardy et al. | 380/21 |
| 5,392,357 | 2/1995 | Bulfer et al. | 380/33 |

*Primary Examiner*—Gilberto Barrón, Jr.
*Attorney, Agent, or Firm*—Frank J. Bogacz

[57] ABSTRACT

A communication system (10) includes a channel (18) that conveys both clear and secure communications and a channel (12) that does not convey clear communications. An interface module (24) resides between these two channels. When a call is attempted through the two channels (12, 18), the module (24) plays a plain-text, audio voice message (54) into the clear side of the call. The message (54) instructs a human operator to take appropriate actions to cause an initiate security setup (ISS) signal (56) to be generated by a secure terminal (28). This message (54) is continuously repeated until the ISS signal (56) is detected at the module (24). The ISS signal (56) includes predetermined frequency components which are notched out of the message (54) so that the ISS signal (56) may be reliably detected at the module (24).

11 Claims, 4 Drawing Sheets

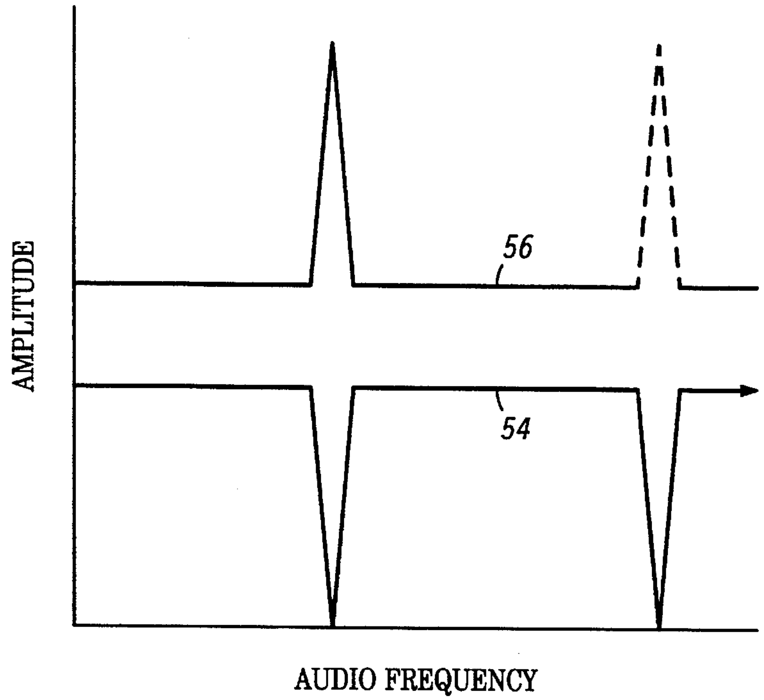
FIG. 3
FIG. 6
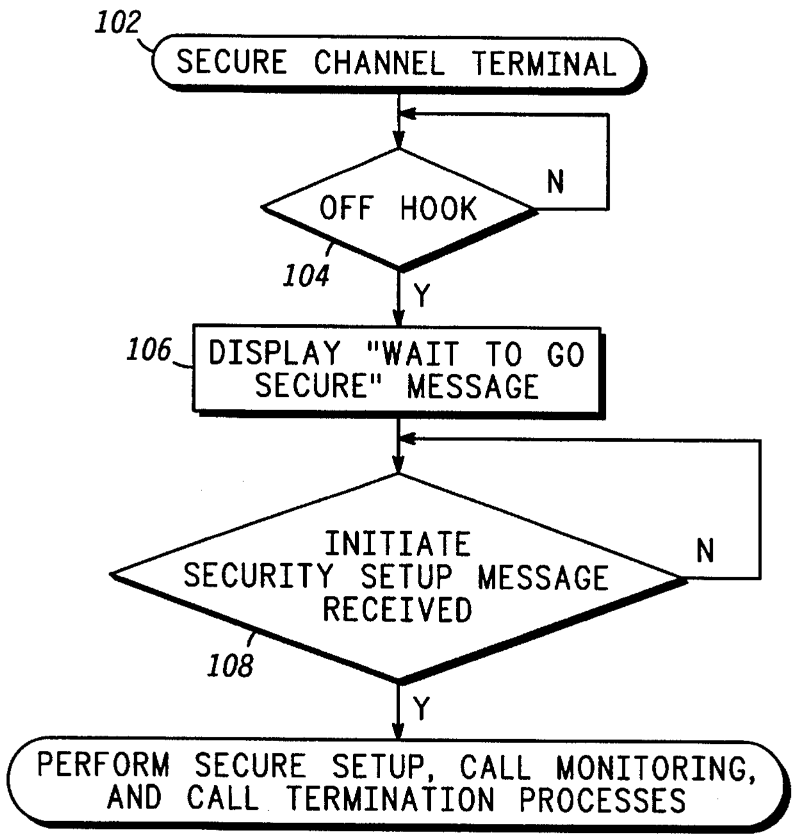

CLEAR CHANNEL INTERFACE MODULE AND METHOD THEREFOR

TECHNICAL FIELD OF THE INVENTION

The present invention relates generally to secure communications. More specifically, the present invention relates to establishing secure calls through a communication network having communication links that accommodate only secure communications and having communication links that accommodate both clear and secure communications.

BACKGROUND OF THE INVENTION

The community of corporations, government entities, and others that require secure communications has built a secure communications infrastructure in recent years. This infrastructure includes a large number of secure communication terminals that couple to the public switched communications network (PSTN) and other communication channels along with a structure for managing and distributing encryption keys. The secure terminals usually operate in both clear and secure modes.

In a typical scenario for establishing a secure call, one secure terminal initiates a call to another secure terminal. The call may, for example, be initiated by dialing a phone number. When the called party answers, both secure terminals first operate in their clear modes. In the clear modes no encryption or decryption of communications take place, and the secure terminals act like "plain old telephones" (POTs). However, if either party to the call wishes to conduct secure communications, that party may push a button on his or her secure terminal, causing that secure terminal to transmit a "initiate security setup" signal to the opposite terminal in the call. Thereafter, both secure terminals engage in a security setup process in which encryption keys, among other data, are exchanged. Upon completion of the security setup process, the secure terminals operate in their secure modes, and communications are encrypted for transmission and decrypted upon receipt.

In accordance with a particularly common type of secure terminal, conventional analog audio signals that are well known in the telephony industry are transmitted and received during the clear mode. However, the encryption and decryption operations are performed digitally. The secure mode utilizes vocoders, digital encryption units, modems, and like components to translate analog audio signals into digital signals, encrypt the digital signals, transmit the digital signals over a conventional PSTN, and perform complementary operations for received data. Thus, conventional analog telephone components are dedicated to clear communications while digitizing and encryption components are dedicated to secure communications. The dedication of various components to the different modes enhances the security provided for communications delivered in the secure mode.

Digital communication networks represent a modern trend. Such networks easily accommodate the secure mode of communication as implemented by the existing infrastructure of secure terminals. The digital signals may simply be communicated without signal translations otherwise performed by modems. However, such networks do not necessarily accommodate the clear mode of operation. While one might possibly design a type of secure terminal that also transmits clear communications digitally, this solution is undesirably costly and impractical. Such a solution could require an entire infrastructure of secure terminals that included additional digitizers, vocoders, decoders, and the like to permit clear digital communications while refraining from compromising security during the secure mode. Additional complication results from making such terminals compatible with conventional analog communications.

SUMMARY OF THE INVENTION

Accordingly, it is an advantage of the present invention that an improved clear channel interface module is provided for operation in a communication system having a channel which accommodates both clear and secure communications and having a channel which does not accommodate clear communications.

Another advantage is that the present invention provides a module and method for reliably starting a secure call when a clear channel cannot be extended between the ends of the call.

Another advantage is that the present invention is compatible with an existing infrastructure of secure terminals.

Another advantage is that the present invention provides a clear channel interface between a digital communication channel and an analog channel.

The above and other advantages of the present invention are carried out in one form by a method of operating an intermediate node that resides between a first channel which accommodates both clear and secure communications and a second channel which does not accommodate clear communications. The method calls for detecting the initiation of a call being setup through the first and second channels. In response to the detection of the initiation of a call, a message is sent through the first channel. The message conveys an instruction to initiate security setup.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 shows a spectral diagram which illustrates characteristics of an audio voice message generated by the clear channel interface and an initiate security setup signal generated by a security terminal which communicates through a communication channel that accommodates clear communications;

FIG. 6 shows a flow chart of a procedure performed by a secure terminal which communicates through a communication channel that does not accommodate clear communications.

DETAILED DESCRIPTION OF THE PREFERRED EMBODIMENTS

Figure 1:
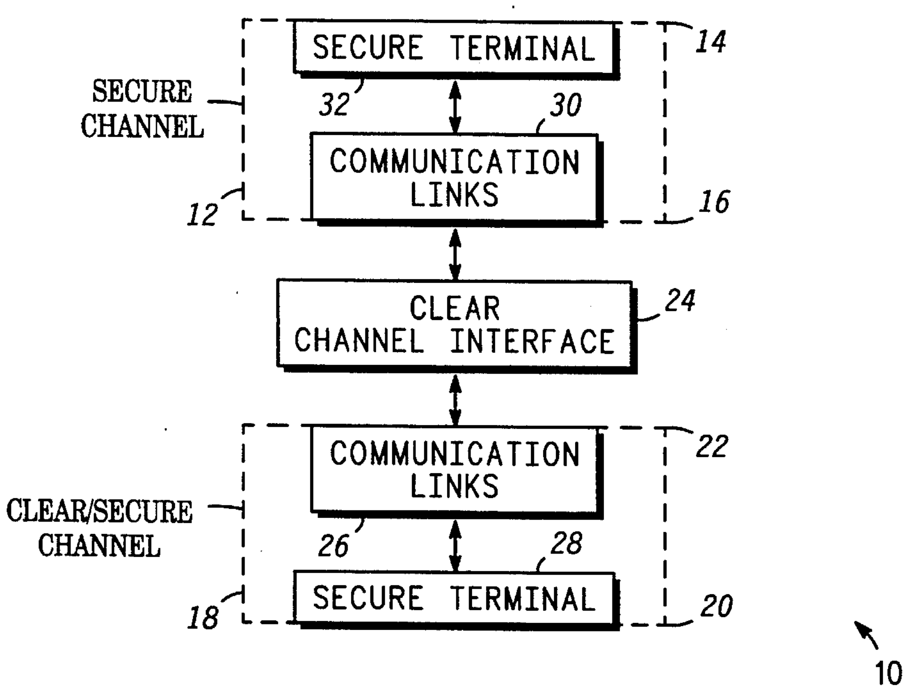
FIG. 1 shows a block diagram of a communications system within which the present invention may be practiced.

FIG. 1 shows a block diagram of a communications system 10. System 10 includes a secure channel 12 having a distant end 14 and an intermediate end 16 and a clear/ secure channel 18 having a distant end 20 and an intermediate end 22. A clear channel interface module 24 is positioned between intermediate ends 16 and 22 of channels 12 and 18, respectively.

Clear/secure channel 18 represents a portion of system 10 over which either clear or secure communications may take place. Relatively little is done to prevent others from obtaining information communicated in the clear. On the other hand, steps are taken to prevent others from obtaining information communicated securely. Such steps may include encryption of the information and/or physically securing the devices and areas through which the information is communicated. Clear communications are referred to using many different phrases, such as plain communications, plain-text communications, and the like. Secure communications are also referred to using different phrases, including cipher communications, cipher text communications, and the like.

For the sake of clarity, channel 18 is referred to simply as clear channel 18 below. However, those skilled in the art will appreciate that secure communications may be transmitted through clear channel 18 by appropriately encrypting the communications before transmission and then decrypting the communications upon receipt.

Clear channel 18 includes any number, assortment, or arrangement of communication links 26 located at its intermediate end 22 and a secure terminal 28 which couples to links 26 and serves as its distant end 20. In the preferred embodiment, communication links 26 are provided by a portion of the vast worldwide public switched telecommunications network (PSTN), which transmits audio information among a vast number of telephonic instruments. Those skilled in the art will appreciate that voice communications represent analog audio signals that are regularly communicated over links 26 as are digital data which are first translated or modulated into audio signals using modems before being communicated over links 26. The portion of the PSTN which serve as links 26 is assigned each time a call is placed between secure terminal 28 and clear channel interface 24.

Secure terminal 28 is a conventional secure telephone unit (STU) of a type known to those skilled in the art of secure communications. Generally, terminal 28 is capable of either clear or secure communications. In fact, terminal 28 normally operates in a clear mode when a call involving terminal 28 is first connected. In the clear mode, "clear" analog voice communications pass through terminal 28 without encryption. As far as secure terminal 28 is concerned, either party to the call may force terminal 28 to enter its secure mode. The secure mode is entered when an "initiate security setup" (ISS) signal is either sent from terminal 28 or received at terminal 28. In response to this signal, terminal 28 automatically engages in a digital data communication session with another secure terminal involved in the call through the use of conventional modem data communications. In the course of this communication session, public encryption keys are exchanged. Thereafter, "secure" analog voice communications are vocoded, encrypted and exchanged with the other secure terminal via modem data communications.

Secure channel 12 includes any number, assortment, or arrangement of communication links 30 located at its intermediate end 16 and a secure terminal 32 which couples to links 30 and serves as its distant end 14. In contrast to clear channel 18, secure channel 12 does not accommodate clear communications. In the preferred embodiment, secure terminal 32 is similar to secure terminal 28, except for differences which are discussed below in connection with FIG. 6. However, these differences need not prevent secure terminal 32 from providing the clear analog voice communications typical of conventional secure terminals.

Rather, in the preferred embodiment communication links 30 do not accommodate the transmission of clear analog voice communications. Links 30 may, for example, be low bandwidth digital communication links from a satellite network. Since links 30 accommodate digital data, they are incompatible with the clear analog communications supported by clear channel 18, secure terminal 28, and possibly secure terminal 32. Clear channel interface module 24 is provided to assist with initiating security setup since a clear path compatible with terminals 28 and 32 is not available.

Figure 2:
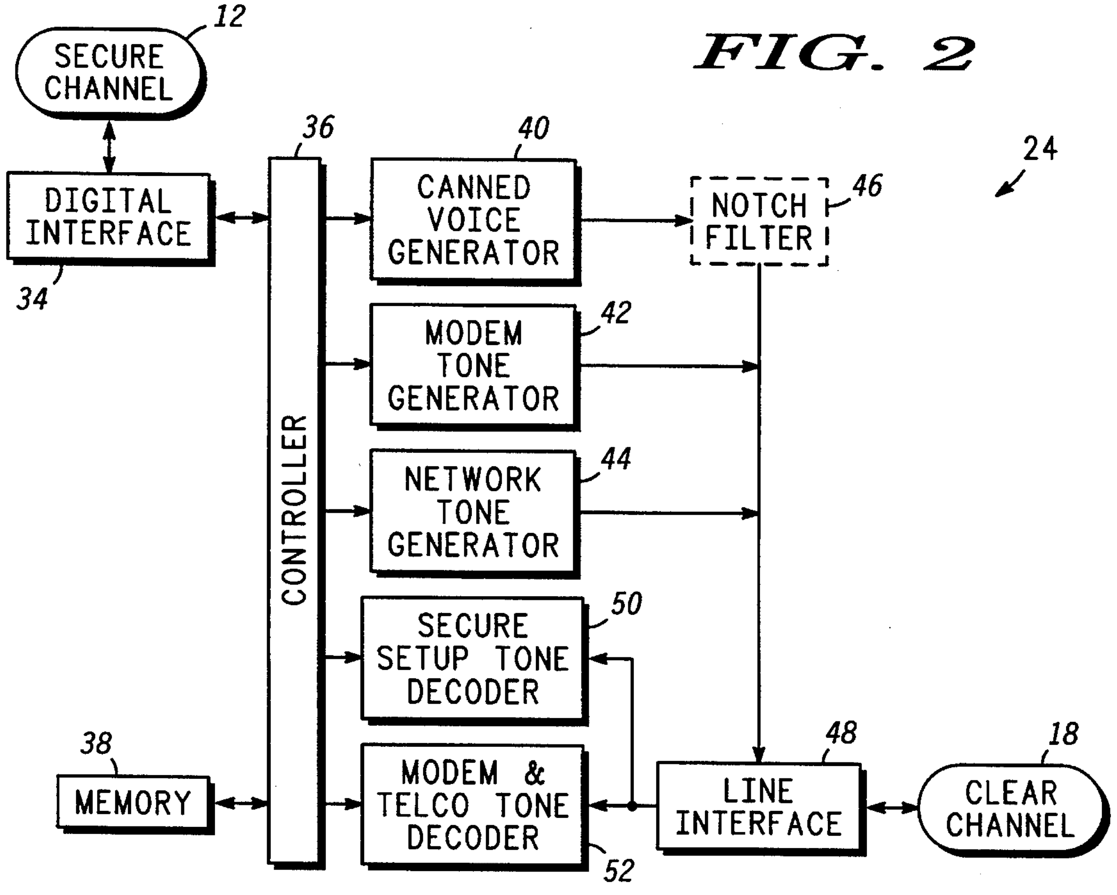
FIG. 2 shows a block diagram of a clear channel interface portion of the communication system.

FIG. 2 shows a block diagram of clear channel interface module 24. Interface 24 includes a digital interface 34 which couples to secure channel 12. Digital interface 34 modulates, translates, and encodes data as needed to effect transmission of the data through secure channel 12 and demodulates, translates, and decodes data as needed to effect the detection of data received from secure channel 12.

Digital interface 34 couples to a controller 36. Controller 36 may be implemented using, for example, a conventional microprocessor circuit. Controller 36 also couples to a memory 38. Memory 38 is configured to store data which serve as instructions to controller 36 and which, when executed by controller 36, cause interface 24 to carry out procedures that are discussed below. In addition, memory 38 includes variables, tables, and databases that are manipulated due to the operation of interface 24.

Controller 36 also couples to a canned voice message generator 40, a modem tone generator 42, and a network tone generator 44. An output from canned voice message generator 40 couples through an optional notch filter 46 to an input port of a telephony line interface 48. Outputs from modem tone generator 42 and network tone generator 44 also couple to the input port of line interface 48. An I/O port of line interface 48 couples to clear channel 18. An output port of line interface 48 couples to inputs of a security setup tone decoder 50 and a modem and telco tone decoder 52. Outputs of decoders 50 and 52 couple to data inputs of controller 36. While the FIG. 2 block diagram shows one particular configuration for interface 24, those skilled in the art will appreciate that numerous variations may also apply. For example, generators 40, 42, and 44 and decoders 50 and 52 may couple to a common data bus. Likewise, various ones of generators 40, 42, and 44, and/or decoders 50 and 52 may be integrated together and/or with controller 36.

Generators 40, 42, and 44 generate analog audio signals in response to controlling data provided by controller 36. Decoders 50 and 52 detect the presence of various analog audio signals received from clear channel 18 and pass data describing these signals to controller 36. Modem tone generator 42 generates well known modem tones into which digital data are translated before being transmitted through clear channel 18. Modem and telco tone decoder 52 performs a complementary function for received modem tones and additionally detects well known telephony signaling, such as dial tone, ring, ring back, and the like. Network tone generator 44 generates conventional telephony signaling and may be implemented using a dual tone multi-function (DTMF) signal generator. Through network tone generator 44, interface 24 may dial outgoing calls through clear channel 18 and generate other audio signals that can pass through an audio path established through clear channel 18.

Canned voice generator 40 represents a message storage device, such as a read only memory, voice synthesizer, audio tape, or the like. Canned voice generator 40 plays an unencrypted, plain-text, voice message which instructs a human operator who hears the message to take whatever actions are necessary to cause the human operator's secure terminal to emit its "initiate security setup" (ISS) signal. This message may be received and played for an operator of a normal telephone or of secure terminal 28 (see FIG. 1) operating in its clear mode. This message may convey something like "PLEASE PRESS SECURE."

A human operator hearing this message may then transfer the call if necessary to a secure terminal 28, inform a person who is cleared to engage in secure communications to come to secure terminal 28 if necessary, and manipulate secure terminal 28 as needed to cause secure terminal 28 to generate its ISS signal. In the preferred embodiment, such manipulation requires only the pressing of a button when an operator has physically inserted a particular key into secure terminal 28. The ISS signal is issued by secure terminal 28 in clear channel 18 under the control of a human operator.

FIG. 3 shows a spectral diagram which illustrates characteristics of an audio voice message 54 generated by the canned voice generator 40 (see FIG. 2) and an ISS signal 56 generated by security terminal 28 (see FIG. 1). ISS signal 56 in the preferred embodiments is an audio tone which exhibits any one of two or more predetermined frequencies. FIG. 3 illustrates one of these frequencies as a dotted line because multiple frequencies need not be present. ISS signal 56 may additionally be configured to comply with particular timing requirements.

As is discussed below in more detail, audio voice message 54 continuously repeats until ISS signal 56 is detected at clear channel interface 24 (see FIG. 2). However, voice audio typically includes frequency components spread throughout the audio band. Thus, typical voice messages include frequency components at the frequency of ISS signal 56. In order to insure, reliable detection of ISS signal 56 in the presence of a continuously active voice message 54, the predetermined frequency components used or potentially used by ISS signal 56 are substantially omitted from audio voice message 54, as illustrated in FIG. 3. Thus, feedback or echo from audio voice message 54 is unlikely to cause a false detection of ISS signal 56.

Referring to FIGS. 2 and 3, in one embodiment of the present invention notch filter 46 is configured to remove the ISS signal frequency components from voice message 54 before transmitting message 54 through clear channel 18. In another embodiment, the ISS signal frequency components are removed prior to storing message 54 in canned voice generator 40, and notch filter 46 is omitted.

Figure 4:
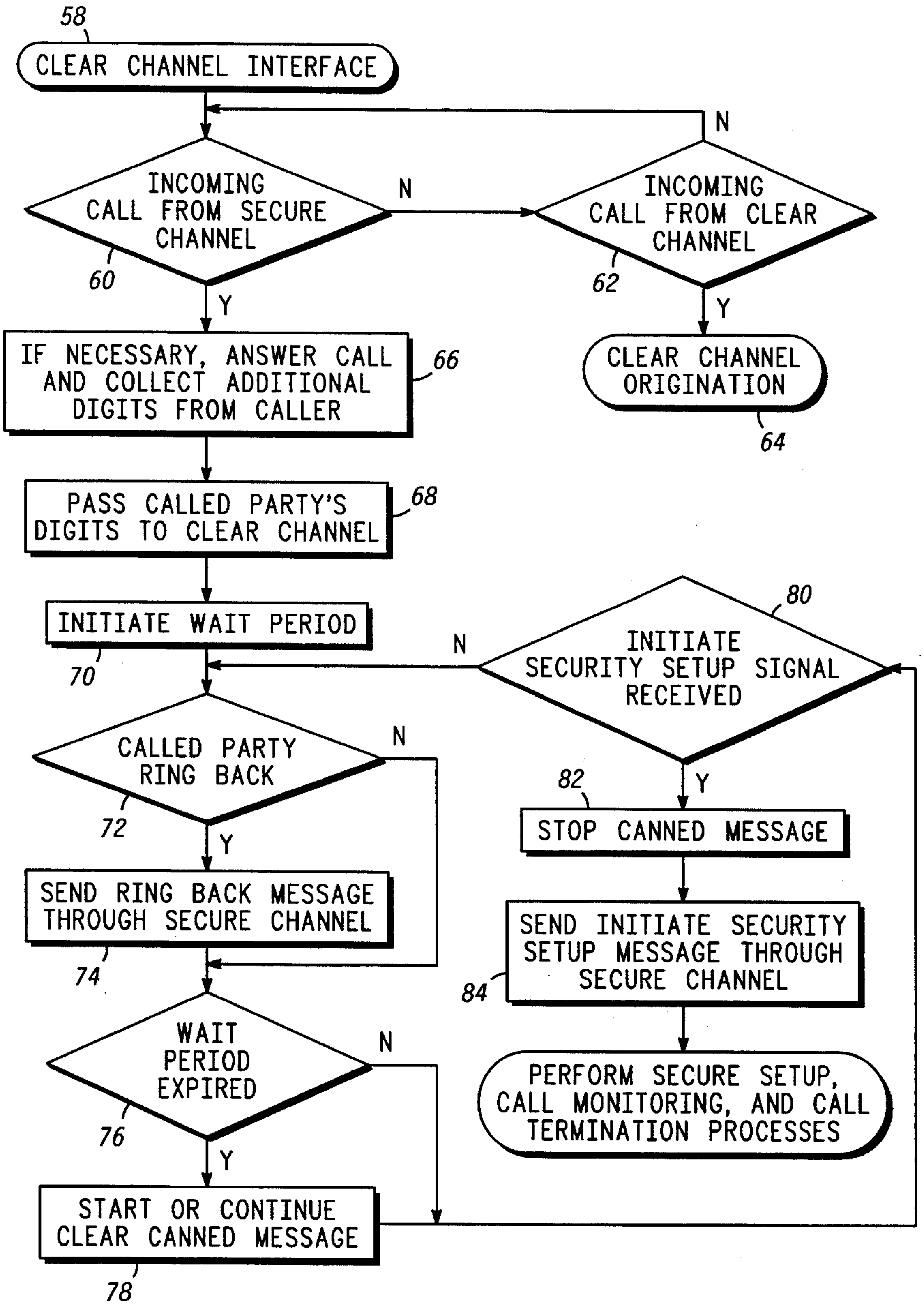
FIG. 4 shows a flow chart of a clear channel interface procedure performed by the clear channel interface.

FIG. 4 shows a flow chart of a clear channel interface procedure 58 performed by clear channel interface 24 (see FIG. 2). Procedure 58 is implemented by controller 36 (see FIG. 2) in response to programming instructions stored in memory 38 (see FIG. 2). At a starting state for procedure 58, no communication paths are routed through interface 24.

In the starting state, procedure 58 performs a query task 60 to detect whether an incoming call is being received from secure channel 12 (see FIG. 1). An incoming call is indicated by the receipt of a predetermined digital message from secure channel 12. If task 60 fails to detect an incoming call from secure channel 12, a query task 62 determines whether an incoming call is being received from clear channel 18 (see FIG. 1). An incoming call may be indicated by the receipt of a ring signal from clear channel 18. If no call is incoming from clear channel 18, program control loops back to task 60 and remains in the loop which includes tasks 60 and 62 until an incoming call is detected. When task 62 detects an incoming call originating from clear channel 18, a clear channel origination procedure 64 is performed. Clear channel origination procedure 64 is discussed below in connection with FIG. 5.

When task 60 detects an incoming call originating from secure channel 12, procedure 58 performs a task 66. Task 66 answers the call if necessary to collect additional digits from the caller, who is presumably at secure terminal 32 (see FIG. 1). The additional digits identify the called party and may, for example, take the form of a conventional phone number. However, in an alternate embodiment of the present invention task 66 is not necessary because the incoming message detected at task 60 conveys the additional digits needed to identify the called party.

After task 66, a task 68 passes the called party's digits to clear channel 18. Task 68 may pass these digits through network tone generator 44 (see FIG. 2). The passing of these digits may amount to dialing a phone number. Next, a task 70 initiates a waiting period, and program control proceeds to a query task 72. Task 72 monitors signals received from clear channel 18 to detect whether a ring back signal is being generated. When a ring back signal is detected, a task 74 is performed to send a predetermined "ring back" data message through secure channel 12. However, when no ring back signal is detected, task 74 is bypassed.

After tasks 72 and 74, a query task 76 determines whether the waiting period initiated in task 70 has expired yet. In the preferred embodiment, this waiting period extends for only a few seconds. When the waiting period expires, a task 78 is performed, but if the waiting period has not yet expired, task 78 is bypassed. Task 78 starts the generation of message 54 (see FIG. 3) from canned voice generator 40 (see FIG. 2). Message 54 is then transmitted from interface 24 through clear channel 18. The first time task 78 is performed, message 54 is simply initiated. At subsequent iterations of task 78, message 54 is continued by being played to the finish of message 54 and then repeating message 54 from its beginning. Message 54 continuously repeats until stopped in response to the receipt of ISS signal 56 (see FIG. 3).

After task 78, a query task 80 determines whether ISS signal 56 has been received yet. So long as ISS signal 56 has not yet been received, program control loops back to task 72. Message 54 will continue to be sent into clear channel 18. While interface 24 operates in the programming loop that includes tasks 72, 74, 76, 78 and 80, secure terminal 28 in clear channel 18 may or may not be answered. Ring back messages are being returned to the calling party, and the calling party may go on-hook at any time whether or not the called party answers. Although not shown in FIG. 4, additional tests may be included to break out of this loop when the calling party hangs up, upon a predetermined time out, or upon other conditions.

When the called party answers, the ring back signals will no longer be sent back to the calling party. The called party will then hear message 54. In response to audio voice message 54, the call may then be transferred to an appropriate security terminal 28, and an appropriate party may be called to the security terminal 28. When the called party is ready, security terminal 28 may be manipulated to cause it to send ISS signal 56 through clear channel 18 to interface 24. When ISS signal 56 is sent, the security setup process has started. Accordingly, the sending of message 54 forces distant end 20 of clear channel 18 to initiate security setup.

As discussed above, message 54 is configured so that it substantially omits ISS signal 56. Thus, secure setup tone decoder 50 (see FIG. 2) may easily and reliably distinguish ISS signal 56 from message 54 which is continuously playing. Task 80 may monitor decoder 50 to determine whether ISS signal 56 has been received. When task 80 determines that ISS signal 56 has been received, a task 82 stops message 54. Next, a task 84 sends an initiate security setup data message through secure channel 12. This message informs secure terminal 32 of the initiation of the security setup process by secure terminal 28.

After task 84, security setup, call monitoring, and call termination processes are performed. Such processes involve the transmission of digital data and are performed primarily at security terminals 28 and 32 in a conventional manner. Interface 24 assists these processes by functioning as a modem for secure terminal 32. Audio modulated data are received from clear channel 18, demodulated to data, and passed through secure channel 12. Unmodulated data are received from secure channel 12, modulated into audio, and passed through clear channel 18. When the call terminates, process 58 may return to its starting state.

Figure 5:
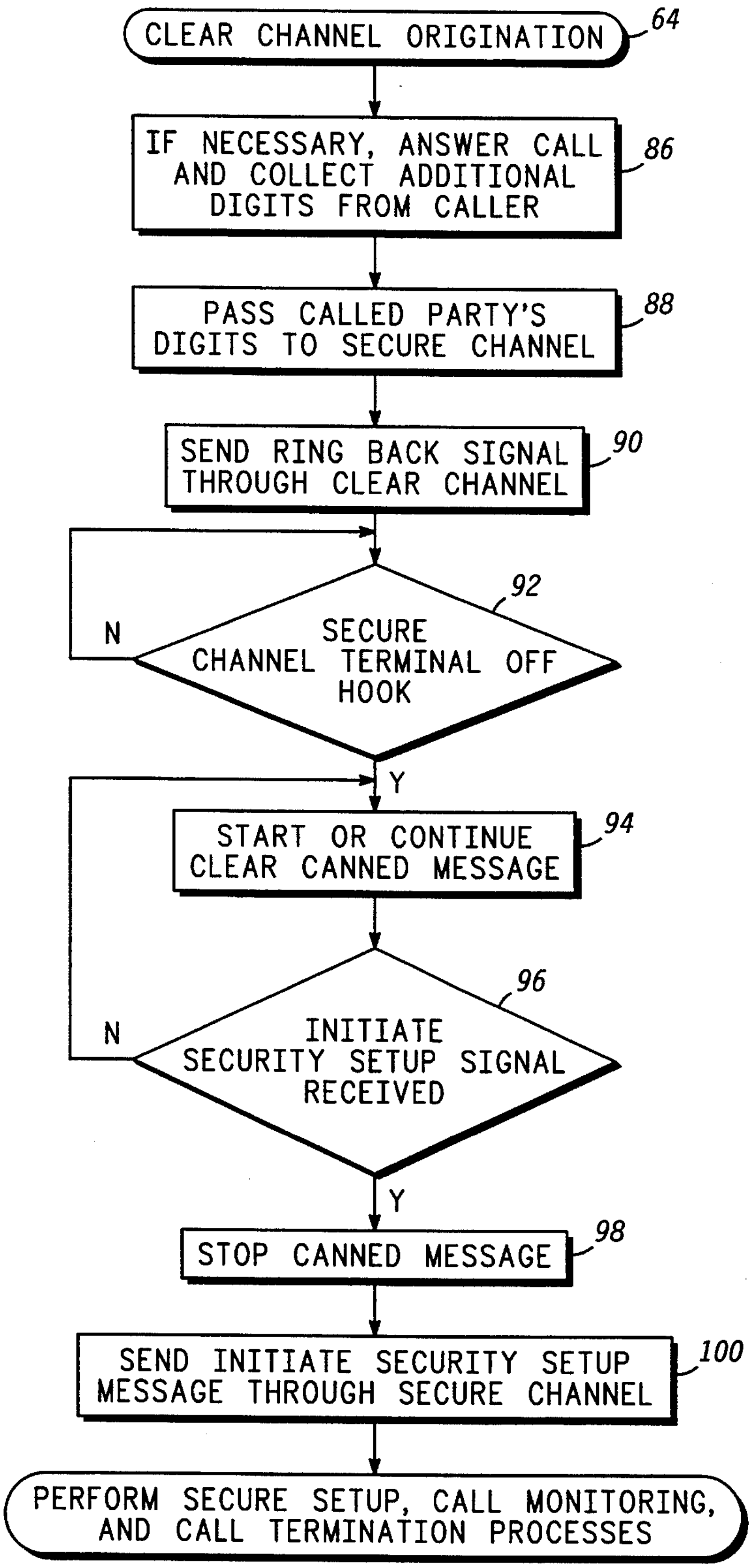
FIG. 5 shows a flow chart of a clear channel origination procedure performed by the clear channel interface.

FIG. 5 shows a flow chart of clear channel origination procedure 64. As discussed above, procedure 64 is performed when a call is being originated from clear channel 18. When initiated, procedure 64 performs a task 86. Task 86 answers a call that is ringing at interface 24 if necessary to collect additional digits from the caller, who may or may not be calling from a secure terminal. The additional digits uniquely identify the called party. However, task 86 is not necessary when a phone number associated with interface 24 is also uniquely associated with secure terminal 32.

After task 86, a task 88 passes the called party's digits to secure channel 12. Task 88 may pass these digits in the form of a predetermined data packet or message transmitted into secure channel 12. After task 88, a connection is formed through secure channel 12 to secure terminal 32. A task 90 may be performed to send a ring back or other feedback signal back into clear channel 18 so that the calling party will be informed of the progress of the call. After task 90, a query task 92 determines whether the secure channel's terminal 32 has gone off hook. Task 92 may make its determination by monitoring for predetermined data messages received from secure channel 12. So long as the called party has not gone off hook, program control remains at task 92. However, additional tasks may be included to break the loop when the calling party goes on hook, when a predetermined time out occurs, and the like.

When task 92 determines that the called party has gone off hook, a task 94 is performed to start or continue message 54 (see FIG. 3). As discussed above, message 54 is transmitted into clear channel 18. Task 94 operates in a manner analogous to task 78, discussed above in connection with FIG. 4. Likewise, a query task 96 operates in a manner analogous to task 80, discussed above in connection with FIG. 4, to determine whether ISS signal 56 has been received from clear channel 18. So long as ISS signal 56 has not yet been received, program control remains in a loop that includes tasks 94 and 96. Although not shown, additional tasks may be included to break this loop when, for example, the calling party hangs up or a predetermined time out occurs. Otherwise, message 54 continuously repeats its verbal instruction to operate in a secure mode until the calling party responds by sending ISS signal 56.

While operating in this loop, the calling party may transfer the call to a secure phone if needed. Alternatively, if the calling party did not realize that a secure-only call was being placed, the calling party may hang-up and place another call from a secure terminal 28. Thus, message 54 provides the calling party with a plain-text message which conveys useful information concerning the nature of the call being attempted.

When task 96 detects ISS signal 56, program control exits the loop, and a task 98 stops message 54. A task 100 then sends an initiate security setup data message through secure channel 12. This message informs secure terminal 32 of the initiation of the security setup process by secure terminal 28. After task 100, security setup, call monitoring, and call termination processes are performed. As discussed above, interface 24 assists these processes by functioning as a modem for secure terminal 32. When the call terminates, program control may return to the starting state of process 58 (see FIG. 4).

Thus, clear channel interface module 24 serves to force the clear channel side of the call to initiate the security setup process. Interface 24 provides a plain-text audio voice message that instructs the party on the clear channel side of the call to initiate the security setup process, regardless of which party initiated the call. This message provides valuable audio feedback to a party coupled to a clear channel concerning the nature of a secure-only communication path without compromising the secure-only path. This party may then take necessary steps, such as transferring the call, and the like, in order to continue the call. Moreover, no clear voice communications are transferred through secure channel 12, and substantially conventional security terminals are employed.

While security terminal 32 (see FIG. 1) may be a substantially conventional security terminal, some slight modifications may be advantageous for operation in connection with interface 24. In particular, security terminal 32 may omit a modem function since that function is performed remotely by interface 24. In addition, its method of operation may be changed to accommodate the use of interface 24.

FIG. 6 shows an abbreviated flow chart of a procedure 102 performed by secure terminal 32. Procedure 102 performs a query task 104 to determine whether secure terminal 32 is off hook. Program control remains at task 104 so long as secure terminal 32 is on hook. When an off hook condition is detected, the off hook condition is communicated to interface 24 (not shown), and a task 106 is performed to display a message that requests a human operator of secure terminal 32 to wait to go secure. When secure terminal 32 is initiating the call, the digits identifying the called party may also be sent to interface 24 (not shown). After task 106, a query task 108 determines whether an initiate security setup message has been received from interface 24. Program control remains at task 108 until this message is received, but additional tasks could be included to break the loop upon the detection of an on hook condition, a predetermined timeout, and the like.

While security terminal 32 operates at task 108, interface 24 plays message 54 into clear channel 18 until ISS signal 56 is returned to interface 24. When ISS signal 56 is returned to interface 24 from clear channel 18, interface 24 then passes initiate security setup message on to security terminal 32. At this point, program control at security terminal 32 performs security setup, call monitoring, and call termination in a conventional manner. Thus, in lieu of clear channel communications, a visual message is displayed which provides a human operator of secure terminal 32 with information concerning the nature of the call being attempted.

In summary, the present invention provides an improved clear channel interface module. This interface module operates in a communication system having a channel which accommodates both clear and secure communications and having a channel which does not accommodate clear communications. The present invention provides a module and method for reliably starting a secure call when a clear channel cannot be extended between the ends of the call. The interface module automatically generates a plain-text message which instructs the clear channel side of the call to initiate security setup. However, security setup is not automatically initiated but remains under control of the party on the clear channel side of the call. The present invention is compatible with an existing infrastructure of secure terminals. Thus, existing equipment may now securely communicate over a communication path that does not support clear communications. Moreover, the present invention provides a clear channel interface between a digital communication channel and an analog channel.

The present invention has been described above with reference to preferred embodiments. However, those skilled in the art will recognize that changes and modifications may be made in these preferred embodiments without departing from the scope of the present invention. For example, those skilled in the art may devise alternate task sequences to accomplish substantially equivalent functions. In addition, alternate types of signal characteristics and messages may be accommodated by the present invention. These and other changes and modifications which are obvious to those skilled in the art are intended to be included within the scope of the present invention.

What is claimed is:

1. A method of operating a clear channel interface that resides between a first channel which accommodates both clear and secure communications and a second channel which does not accommodate clear communications, said method comprising the steps of:

detecting an initiation of a call being setup through said first and second channels;

initiating a message that conveys a signal to initiate a security setup;

said initiate security setup signal is at least one audio tone;

said message is an audio voice message;

said at least One audio tone is substantially absent from said audio voice message;

sending, in response to said detecting step, said message through said first channel, said message conveying an instruction to said second channel to initiate a security setup; and determining, after said initiating step, when the security setup signal is received from said first channel;

configuring said message to substantially omit said initiate security setup signal from said message; and stopping said message after said initiate security setup signal is received by said second channel.

2. A method as claimed in claim 1 wherein said message is a recorded plain-text message.

3. A method as claimed in claim 1 wherein said message is configured to instruct a human operator to undertake actions which cause an initiate security setup signal to be sent through said first channel.

4. In a communication system having a first channel which accommodates both clear and secure communications and having a second channel which does not accommodate clear communications, said first channel and said second channel each having distant ends and having intermediate ends, a method of establishing a secure call comprising the steps of:

positioning an intermediate node coupled to said intermediate ends of said first and second channels;

initiating a message from one of said distant ends, through said intermediate node, to another of said distant ends;

sending an initiate security setup signal from a one of said distant ends of said first channel;

configuring said message to substantially omit said initiate security setup signal therefrom;

said initiate security setup signal is an audio tone;

said message is an audio voice message; and said audio tone is substantially absent from said audio voice message;

forcing, from said intermediate node, one of said distant ends of said first channel to initiate a security setup instruction which is included in said message; and transmitting, in response to said initiating step, a message including an initiate security call setup signal from said intermediate node to said distant ends of said first channel.

5. A method as claimed in claim 4 wherein said message is a recorded plain-text message.

6. A method as claimed in claim 4 additionally comprising the step of continuously repeating said transmitting step until after said initiate security setup signal is sent from said one of said distant ends of said first channel.

7. A method as claimed in claim 4 wherein said message is configured to instruct a human operator to take actions which cause an initiate security setup signal to be sent from said one of said distant ends of said first channel.

8. A method as claimed in claim 4 wherein one of said intermediate node and said second channel is configured to prevent clear voice communications from being transmitted from said first channel through said second channel.

9. A clear channel interface module for use in establishing a secure communication path through a first channel which accommodates both clear and secure communications and a second channel which does not accommodate clear communications, said comprising:

a message storage device for storing a message that conveys an instruction to initiate security setup;

an initiate security setup signal is at least one audio tone;

said message is an audio voice message; and said at least one audio tone is substantially absent from said audio voice message sent through said first channel;

a controller coupled to said first and second channels and to said message storage device, said controller being configured to detect a call initiation being setup through said first and second channels and to initiate sending of said message through said first channel in response to-said call initiation.

10. A module as claimed in claim 9 wherein said message is repeatedly sent through said first channel after initiation, and said controller is further configured to:

determine when an initiate security setup signal is received from said first channel; and stop said message after said initiate security setup signal is received.

11. A module as claimed in claim 9 wherein said message is configured to instruct a human operator to undertake actions which cause as initiate security setup signal to be sent through said first channel.

* * * * *